(12) United States Patent
Okerlund

(10) Patent No.: US 6,296,884 B1
(45) Date of Patent: Oct. 2, 2001

(54) PRE-PACKAGED S'MORE KIT

(76) Inventor: David F. Okerlund, 11874 Combes Park Dr., Boise, ID (US) 83713

( * ) Notice: Subject to any disclaimer, the term of this patent is extended or adjusted under 35 U.S.C. 154(b) by 0 days.

(21) Appl. No.: 09/454,222

(22) Filed: Dec. 9, 1999

(51) Int. Cl.⁷ .................................................. A23G 1/00
(52) U.S. Cl. ...................... 426/104; 426/120; 426/132; 426/128; 99/421 A
(58) Field of Search ........................... 426/112, 115, 426/120, 124, 132, 275, 104, 128, 571; 206/541, 542, 216; 446/219, 76, 77, 71; 359/408, 399, 362; 99/421 A

(56) References Cited

U.S. PATENT DOCUMENTS

| | | | |
|---|---|---|---|
| 3,498,798 | * 3/1970 | Baur et al. | 426/124 |
| 3,635,732 | * 1/1972 | Bissett | 99/107 |
| 4,172,629 | * 10/1979 | Allen | 350/4.1 |
| 4,874,618 | * 10/1989 | Seaborne et al. | 426/76 |
| 4,938,975 | * 7/1990 | Waller | 426/91 |
| 4,988,110 | * 1/1991 | Zukerman et al. | 273/286 |
| 5,727,819 | * 3/1998 | Grosskopf et al. | 283/81 |
| 5,731,020 | * 3/1998 | Russo | 426/104 |
| 5,800,236 | * 9/1998 | Joun | 446/46 |
| 5,843,500 | * 12/1998 | Guarino | 426/91 |
| 5,950,614 | * 9/1999 | Guinnane | 126/25 R |

* cited by examiner

Primary Examiner—Nina Bhat
(74) Attorney, Agent, or Firm—Craig M. Korfanta

(57) ABSTRACT

A pre-packaged s'more kit containing a plurality of marshmallows, crackers, and flavored wafers shaped to fit inside an elongated container. Preferably, the kit includes a roasting utensil also designed to fit within the elongated container. Once the s'more ingredients are removed, the elongated container can be reused as a storage container, a drinking cup, even a refractory telescope. Advantageously, a s'more connoisseur need only purchase one easily storable and transportable kit Instead of separately purchasing the ingredients in bulk.

16 Claims, 10 Drawing Sheets

Figure 1:
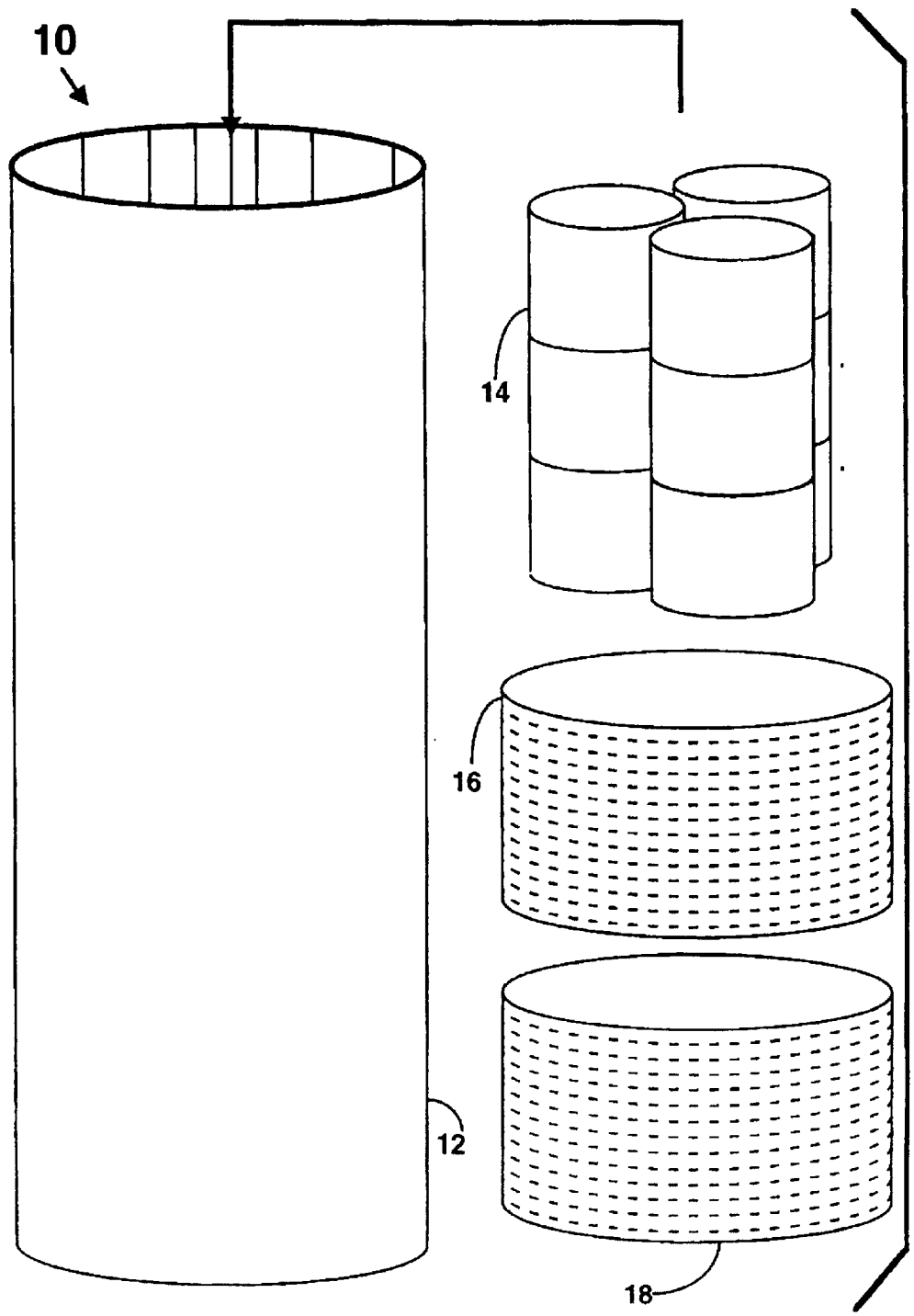
Figure 2A:
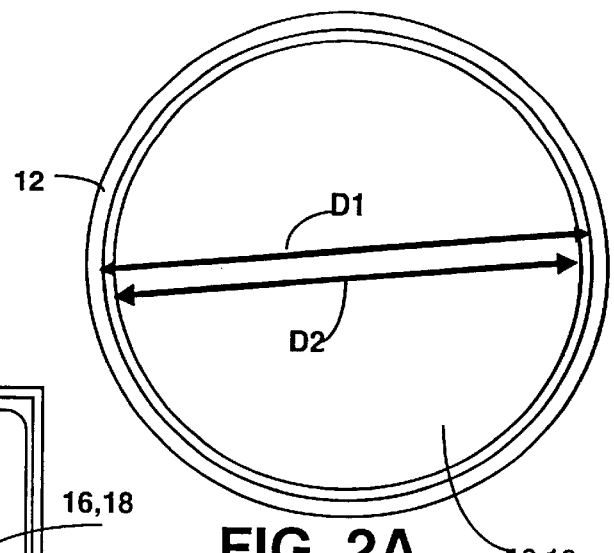
Figure 2B:
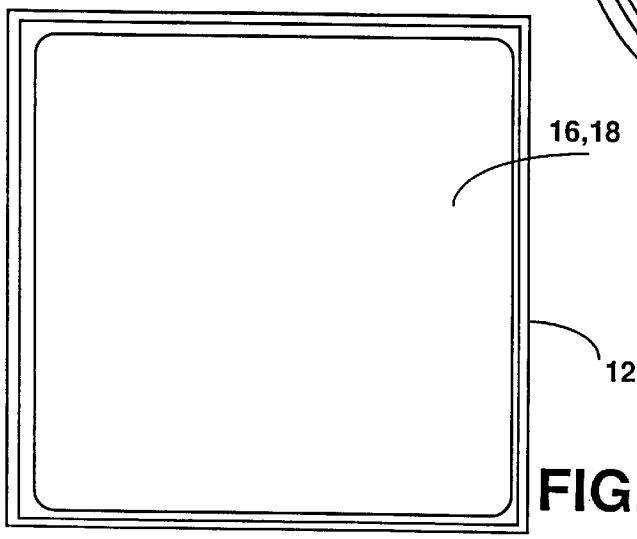
Figure 2C:
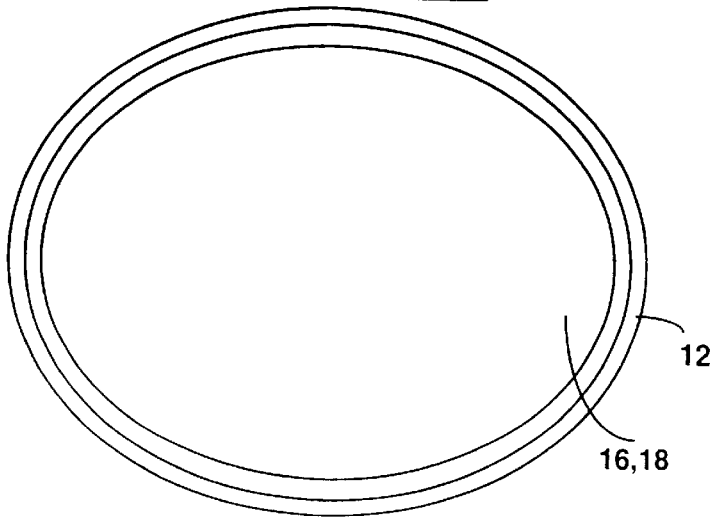
Figure 3:
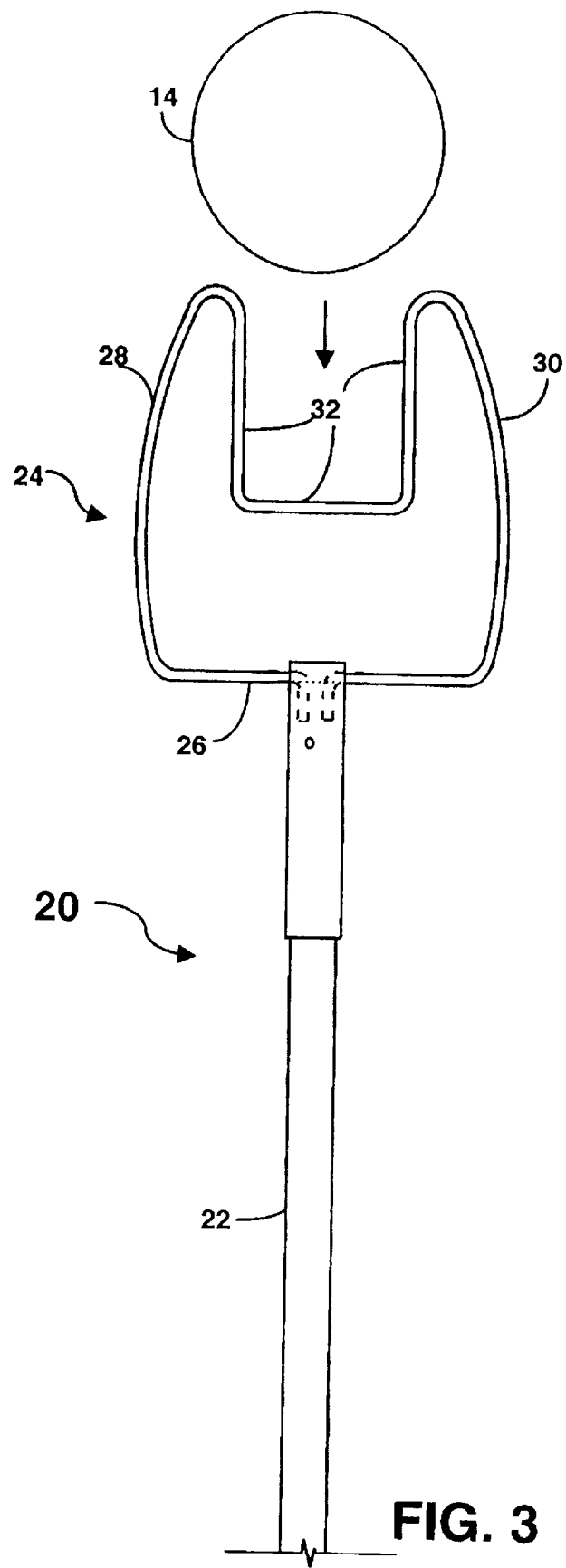

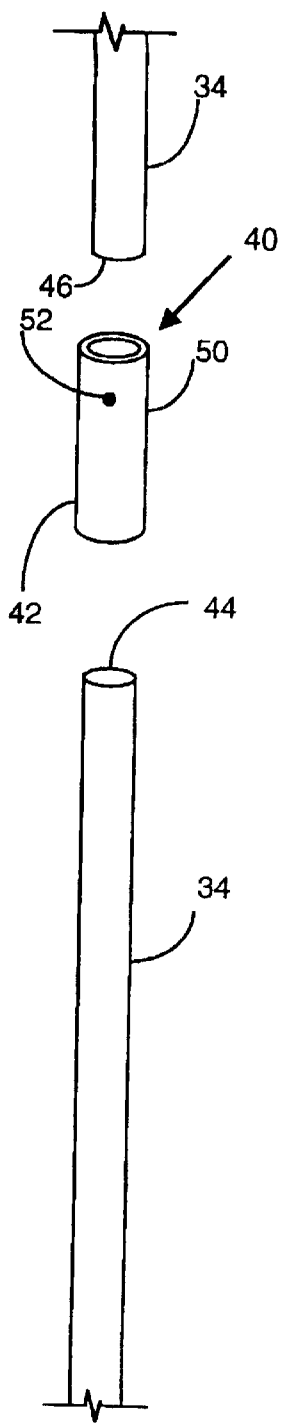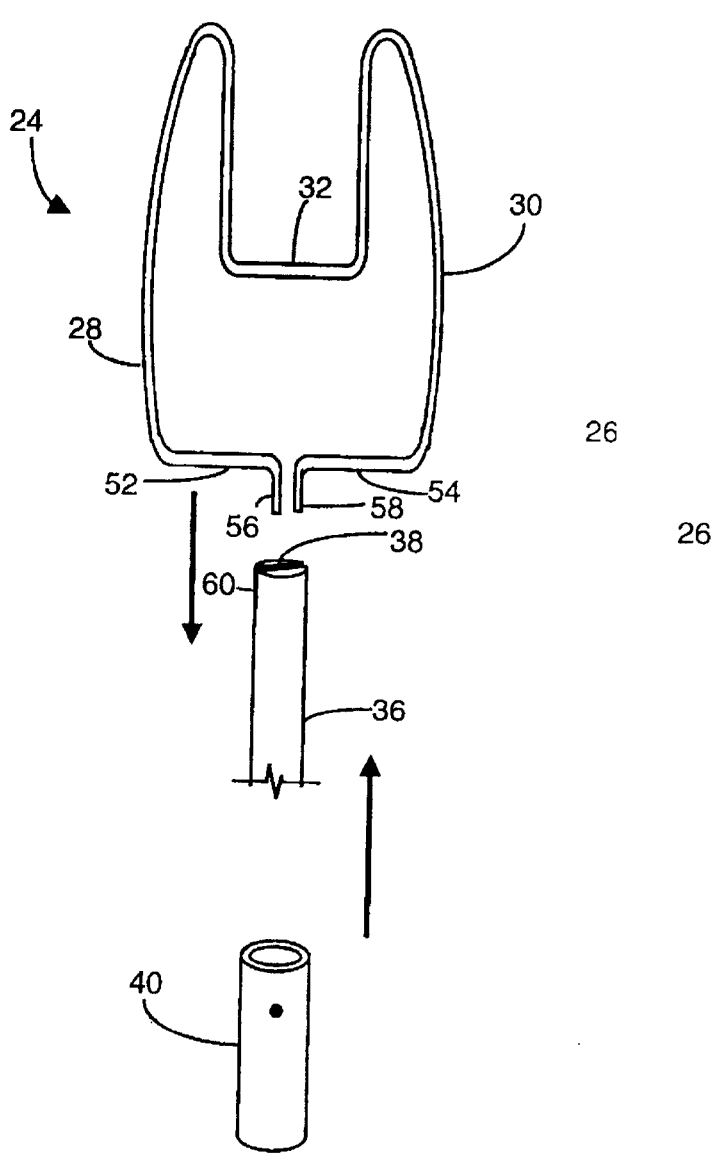
FIG. 6  FIG. 7

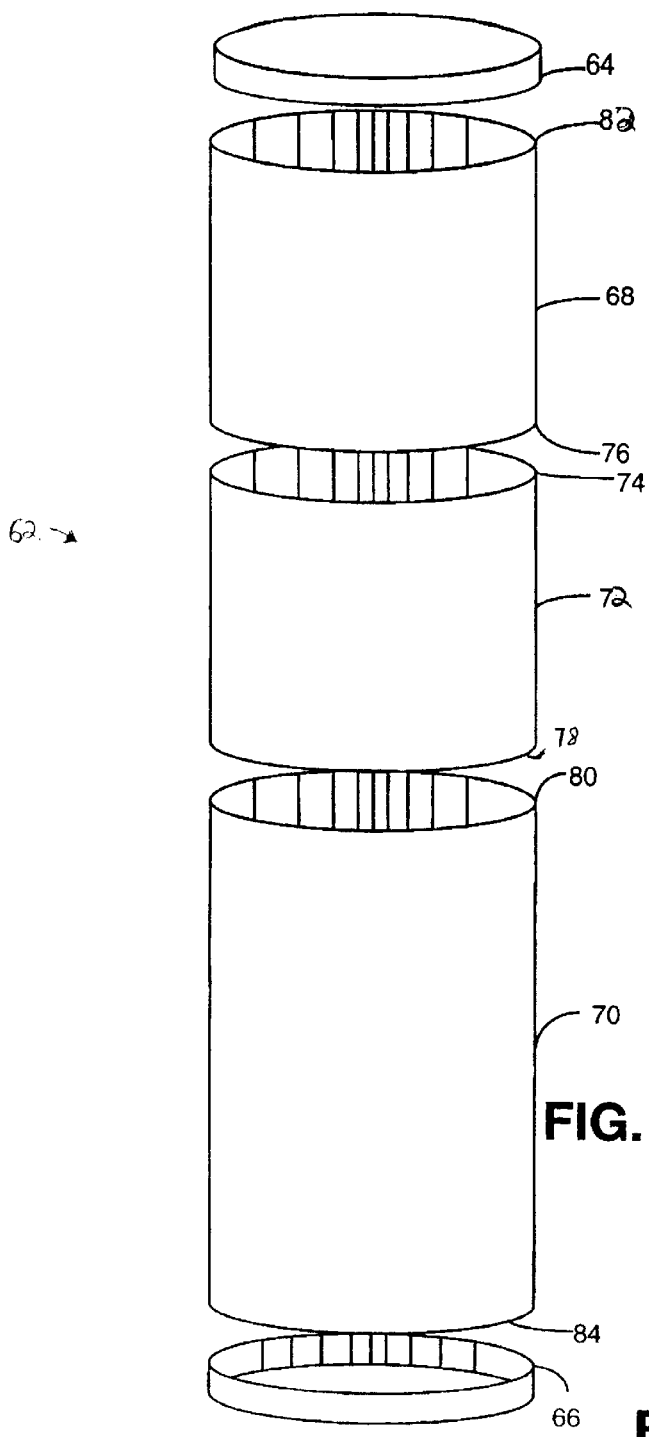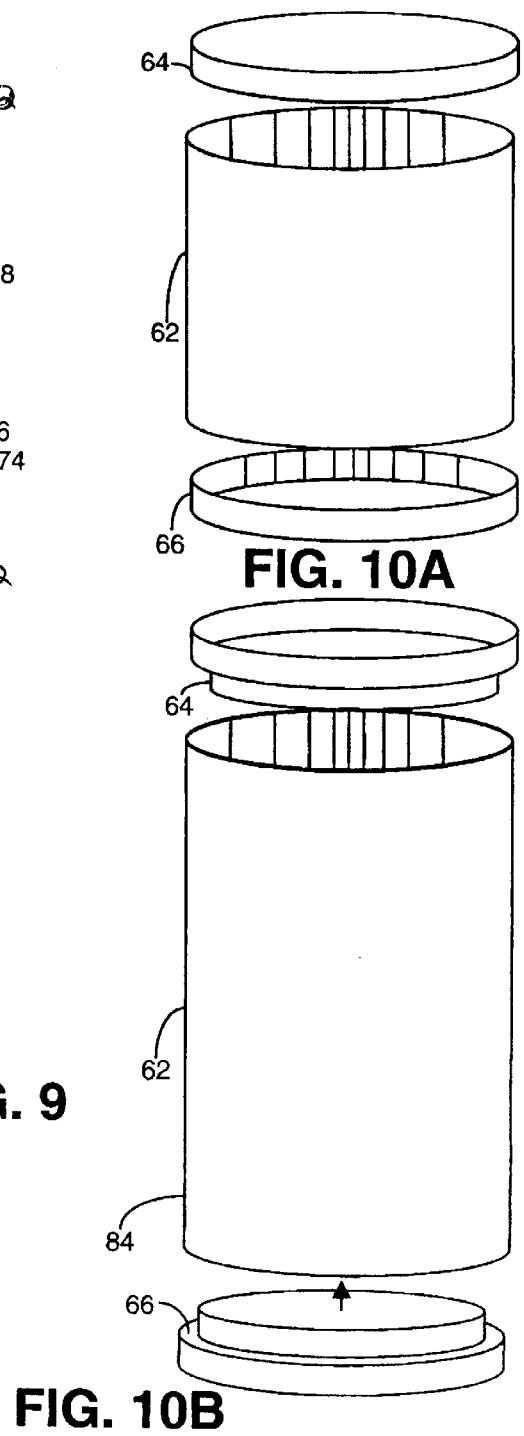

PRE-PACKAGED S'MORE KIT

FIELD OF THE INVENTION

This invention relates generally to a food product for human consumption. More particularly, it relates to a kit for making s'mores.

BACKGROUND

Campers sitting around a fire and families enjoying back-yard barbeques often take pleasure in creating a dessert known as a s'more. A s'more generally includes a toasted marshmallow and a piece of chocolate sandwiched between two graham crackers. To enjoy these treats, however, requires extended preparation and can be quite expensive. A person must separately purchase marshmallows, graham crackers, and chocolate bars. There are never an equal number of components leading to inconvenient storage and inevitable wasted product. Moreover, the differing shapes and sizes of commercially available graham crackers and chocolate bars are not conducive to forming a s'more. Additionally, the s'more connoisseur must make, purchase, or locate a utensil for roasting the marshmallows. Such may require the use of a knife to sharpen a stick or a pre-fabricated skewer which both pose serious puncture hazards. Moreover, each of these items must be individually transported to the campsite or backyard barbeque, and when consumed require proper disposal of all packaging materials.

Accordingly, it would be advantageous to have a pre-packaged kit conveniently and inexpensively designed to contain all the materials required to make s'mores including a roasting utensil. The pre-packaged s'more kit would ideally include sufficient quantities of graham crackers, marshmallows, and chocolate wafers to make a specified number of s'mores without leaving any leftover. Advantageously, the chocolate wafers and the graham crackers would be of similar shape and size. It would also be advantageous to have a pre-packaged s'more kit suitably designed to be easily transportable to a campsite, regardless of the consumer's mode of transportation. It would be a further advantage to have a pre-packaged s'more kit designed to reduce waste once consumed.

SUMMARY

The invention is directed to a pre-packaged s'more kit. The kit contains a plurality of marshmallows, crackers, and flavored wafers shaped to fit inside an elongated container. Preferably, the kit includes a safer roasting utensil with generally rounded features also designed to fit within the elongated container. To reduce waste, once the s'more ingredients are removed, the elongated container can be reused as a storage container, a drinking cup, even a refracting telescope. Advantageously, a s'more connoisseur need only purchase one easily storable and transportable kit instead of separately purchasing each ingredient in bulk. Another non-readily apparent advantage is that the components are provided in substantially equal portions to prevent dissatisfaction among participants as to who received the larger s'more.

Additional advantages and novel features of the invention will be set forth in part in the description that follows, and in part will become apparent to those skilled the art upon examination of the following or may be learned by practice of the invention. The advantages of the invention may be realized and attained by means of the instrumentalities and combinations particularly pointed out in the appended claims.

DESCRIPTION OF THE DRAWINGS

FIG. 1 is a schematic representation of one embodiment of a pre-packaged s'more kit.

FIGS. 2A, 2B, and 2C are cross sectional views of the elongated container housing crackers, flavored wafers and marshmallows according to one embodiment of the present invention;

FIG. 3 is a schematic representation of a roasting utensil according to one embodiment of the present invention;

FIG. 4 is a schematic representation of a modular roasting utensil according to one embodiment of the present invention;

FIG. 5 is a cross-sectional view of a pre-packaged s'more kit housing a modular roasting utensil, marshmallows, crackers, and chocolate wafers according to one embodiment of the present invention;

FIG. 6 is a schematic representation of one version of the roasting utensil;

FIG. 7 is a schematic representation of a second version of the roasting utensil;

FIG. 8 is a schematic representation of one version of the elongated container according to one embodiment of the present invention;

FIG. 9 is a schematic representation of a second version of the elongated container according to one embodiment of the present invention;

FIGS. 10A and 10B are schematic representations of the end caps according to one embodiment of the present invention;

FIGS. 11A and 11B are schematic representations showing the placement of lenses on the end caps according to one embodiment of the present invention; and FIG. 12 is a schematic representation of a refracting telescope formed by the elongated container according to one embodiment of the present invention.

DETAILED DESCRIPTION OF THE INVENTION

Referring to FIG. 1, the invented pre-packaged s'more kit, generally referenced as 10, includes an elongated container 12 housing a plurality of marshmallows 14, crackers 16, and flavored wafers 18. Preferably, the ratio of marshmallows 14 to crackers 16 to flavored wafers 18 should be 1:2:1. The number of each being limited by the size of elongated container 12. Flavored wafers 18 may be chocolate, peanut butter, butterscotch, strawberry, or any other suitable flavor. Marshmallows 14, crackers 16, and flavored wafers 18 may also be preserved in resealable plastic bags.

Referring to FIG. 2A, in one version, elongated container 12 may be a hollow cylinder such that a cross-sectional view perpendicular to its longitudinal axis reveals a circular perimeter with a first diameter D1. Correspondingly, the cross-sectional perimeter of crackers 16 and flavored wafers 18 may also be circular with a second, smaller diameter D2. These shapes allow the crackers 16 and flavored wafers 18 to easily slide into and remain secure within elongated container 12. However, referring now to FIGS. 2B and 2C the cross-sectional perimeters of elongated container 12, crackers 16, and flavored wafers 18 could be a polygonal, oval, or any other regular or irregular shape configured to allow crackers 16 and flavored wafers 18 to easily slide into and remain secure within elongated container 12.

Referring to FIG. 3, a preferred embodiment includes a roasting utensil 20 allowing a user to safely suspend at least one marshmallow 14 over a heat source such as a fire or hot coals. Roasting utensil 20 includes an elongated handle 22 with a roasting tip 24 securely fastened to one end. In one version, the roasting tip 24 includes a base 26, first and second supports 28, 30, and a holder 32 configured to receive and hold at least one marshmallow 14. Advantageously, the joints between supports and holder 32 may be rounded transitions to reduce puncture hazards.

Figure 4:
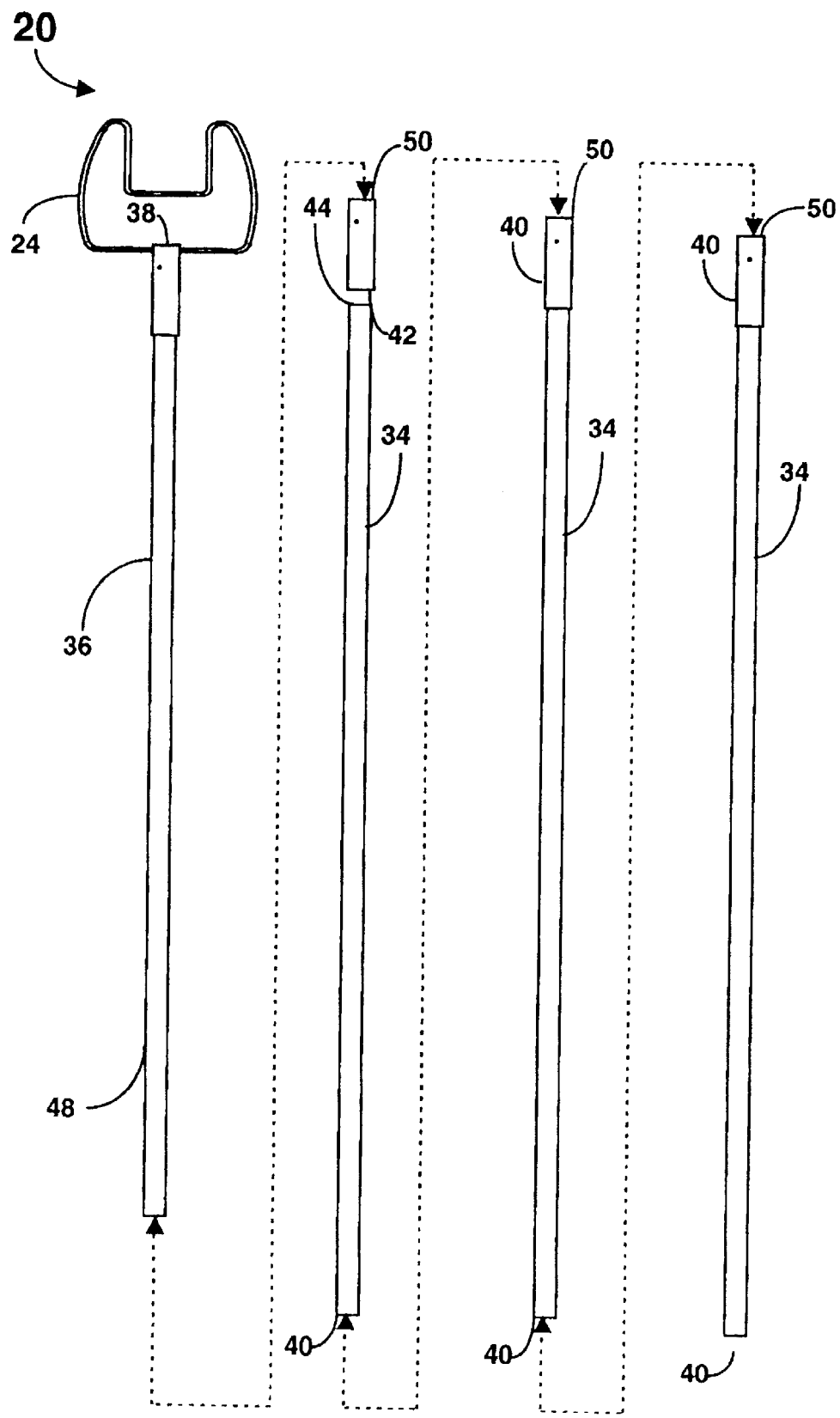
Figure 5:
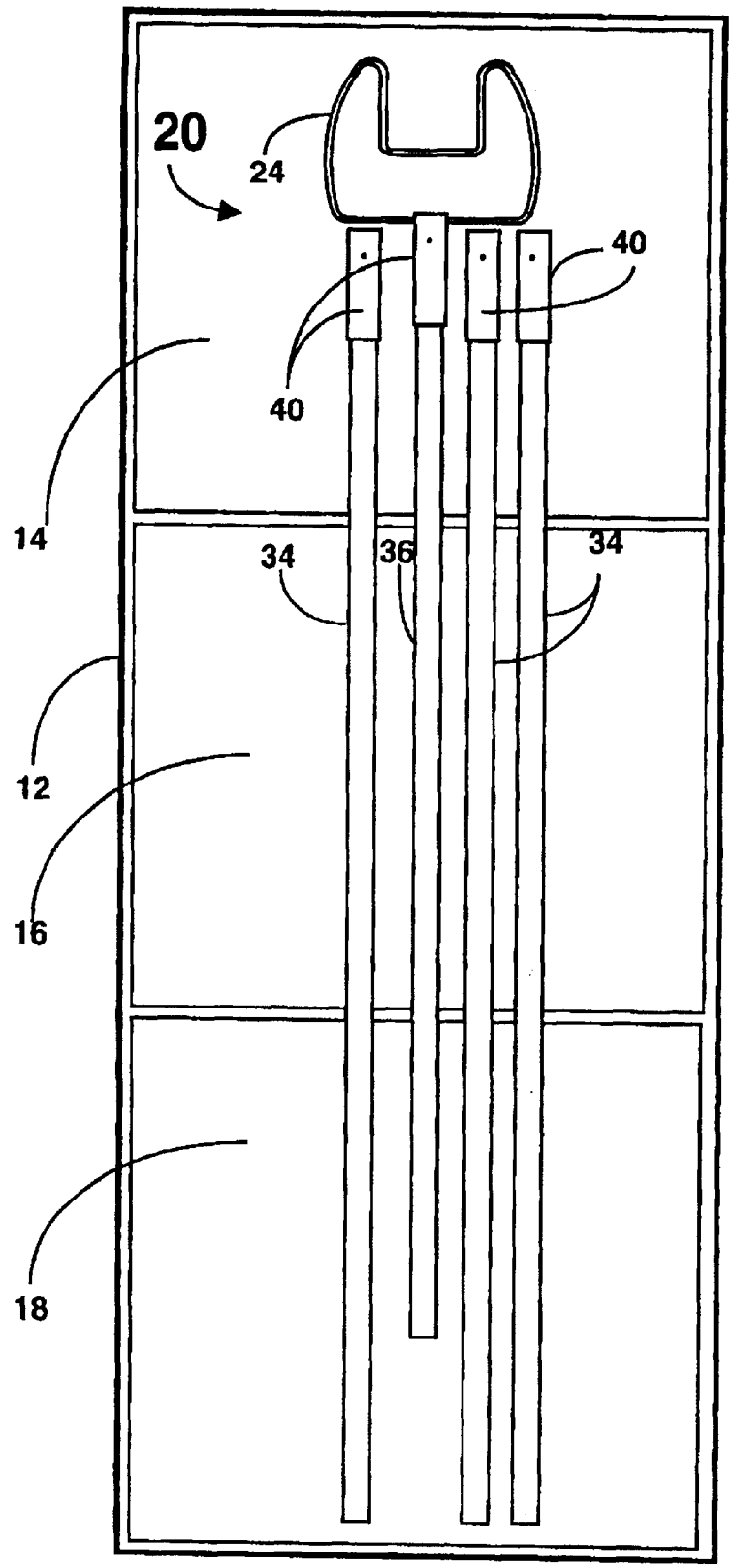

Preferably, roasting utensil 20 is configured to fit within elongated container 12. Consequently, handle 22 may be made up of a plurality of elongated modules 34 and one roasting module 36 as shown in FIG. 4. Roasting tip 24 may be securely attached to the first end 38 of roasting module 36. The elongated modules 34 each include a sleeve 40, the first end 42 of which may be fixed around the first end 44 of elongated module 34 by crimping, gluing, or other suitable method. Furthermore, each sleeve 40 may be configured so that the second end 46 of elongated module 34 and the second end 48 of roasting module 44 can securely, but removeably, slide into the second end 50 of sleeve 40. The remaining elongated modules 34 and roasting module 36 are similarly joined to form elongated handle 22 with a roasting tip 24 protruding from one end. Preferably, the length of each elongated module 34 with attached sleeve 40 and roasting module 36 with attached roasting tip 24 should be less than the length of the elongated container 12, thus allowing the unassembled roasting utensil 20 to easily fit within elongated container 12 as illustrated in FIG. 5. Advantageously, elongated modules 34 may be manufactured from a relatively light duty material which is sufficiently strong to support modules 34 and marshmallow 14 and yet designed to break apart upon improper use.

In one version as illustrated in FIG. 6 each sleeve 40 may be a hollow cylindrical ferrule. Each ferrule, also referenced as 40, may be made of aluminum or other suitable material. The first end 42 of each ferrule 40 may be crimped onto the first end 44 of each elongated module 34. Second end 50 of each ferrule 40 is configured to receive and securely retain the second end 46 of another elongated module 34. This may be accomplished by forming at least one dimple 52 on the second end 50 of each ferrule. Dimple 52 protrudes inward from the inside wall of ferrule 40 and grips elongated module 34 as the second end 46 of elongated module 34 is inserted into the second end 50 of ferrule 40.

As shown in FIG. 7, roasting tip 24 may be securely attached to the first end 44 of roasting module 36 by first forming roasting tip 24 from a single piece of moldable material such as copper wire. As above, roasting tip includes first and second supports 28, 30, a holder 32 and a base 26. However, base 26 includes two horizontal members 52, 54 and two vertical members 56, 58. Second, a slot 60 may be formed in the first end 38 of roasting module 44. The depth of slot 60 may be slightly greater than the length of vertical members 56, 58. Third, the vertical members 56, 58 of base 26 may be inserted into slot 60, and finally a ferrule 40 may be crimped or otherwise secured onto the first end 38 of roasting module 36 around slot 60 locking roasting tip 24 into place.

Figure 8:
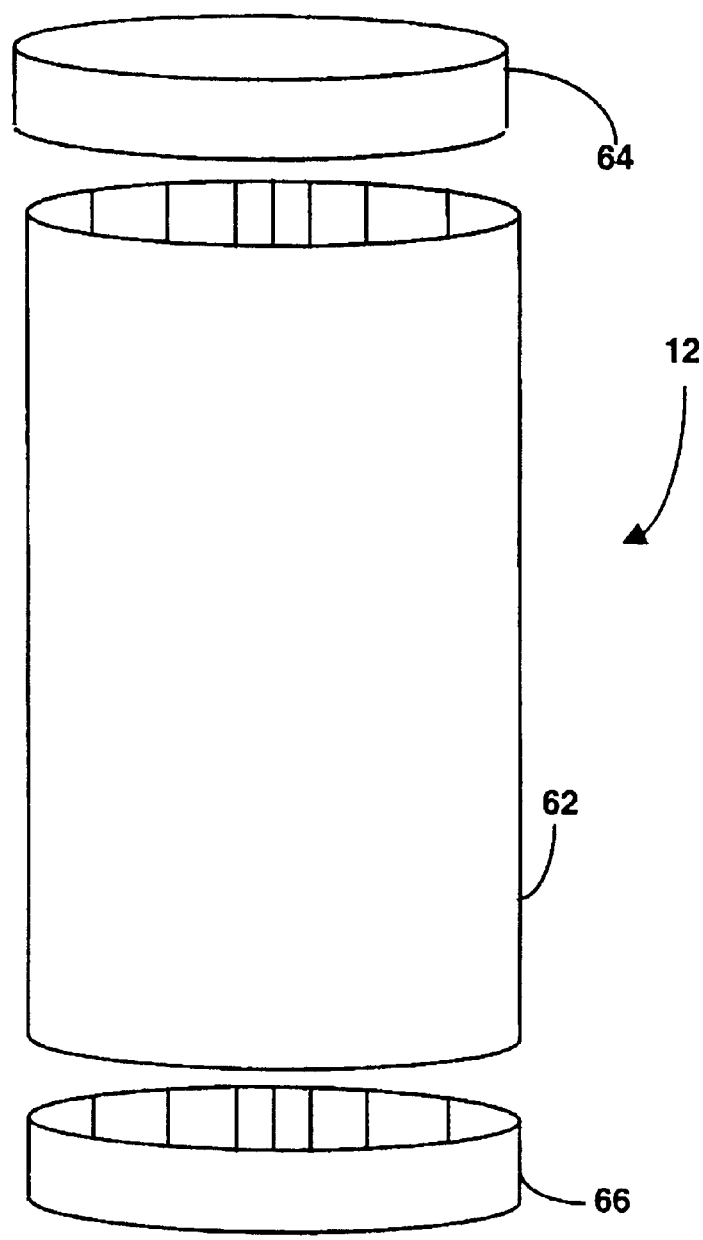

In one version shown in FIG. 8, elongated container 12 includes a hollow body member 62 and first and second end caps 64, 66. End caps 64, 66 are each configured to attach to either end of hollow body member 62 securing its contents. In a second version shown in FIG. 9, hollow body member 62 may include first and second hollow portions 68, 70, and inner sleeve 72 each shaped according to the cross-sectional perimeter of the elongated container 12. The first end 74 of inner sleeve 72 inserts into and fits snuggly within the first end 76 of first hollow portion 68. The second end 78 of inner sleeve 72 protrudes from the first end 76 of the first hollow portion 68. The second end 78 of the inner sleeve 72 inserts into and fits snugly within the first end 80 of the second hollow portion 70 joining the first and second hollow portions 68, 70. The first end-cap 64 attaches to the second end 82 of the first hollow portion 68 and the second end-cap 66 attaches to the second end 84 of the second hollow portion 70. Preferably, first and second end-caps 64, 66 are interchangeable, each configured to attach to either end 76, 80, 82, 84 of first or second hollow portions 68, 70. As illustrated in FIGS. 10A and 10B, end caps 64, 66 may be configured to fit securely around hollow body member 62 or to fit securely within hollow body member 62.

The above design allows elongated container 12 to serve multiple functions. Once marshmallows 14, crackers 16, and flavored wafers 18 are removed, the elongated container 12 can be used to store other items. Separating the first and second hollow portions 68, 70, leaving the first and second end-caps 64, 66 in place creates two drinking cups. Both the first and second end-caps 64, 66 can be placed on one of either the first or second hollow portions 68, 70 creating a smaller reusable storage container.

Figure 11A:
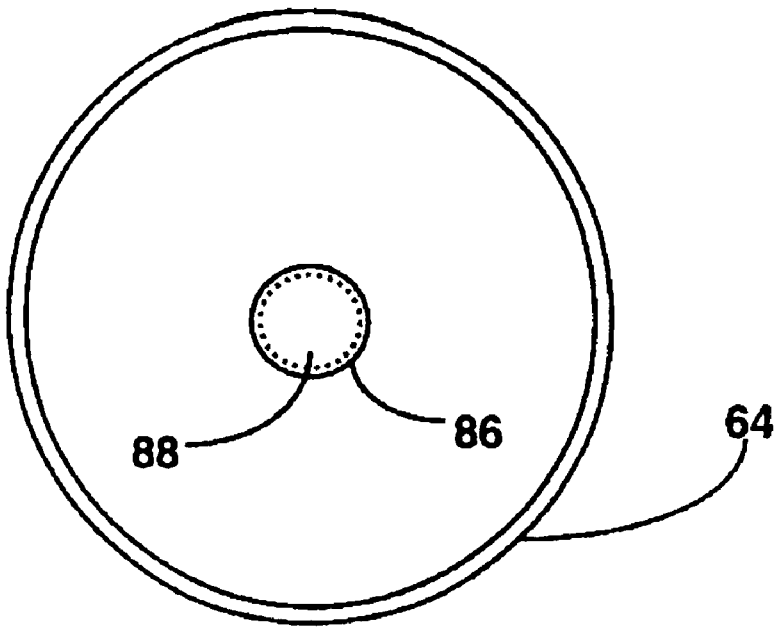
Figure 11B:
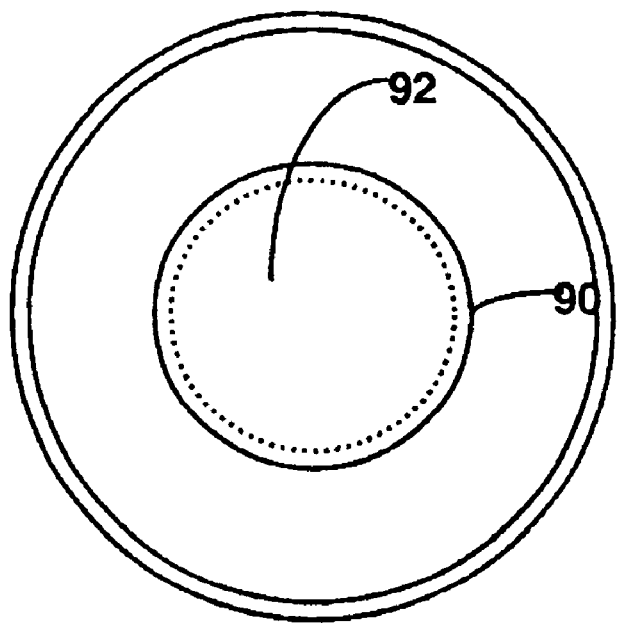
Figure 12:
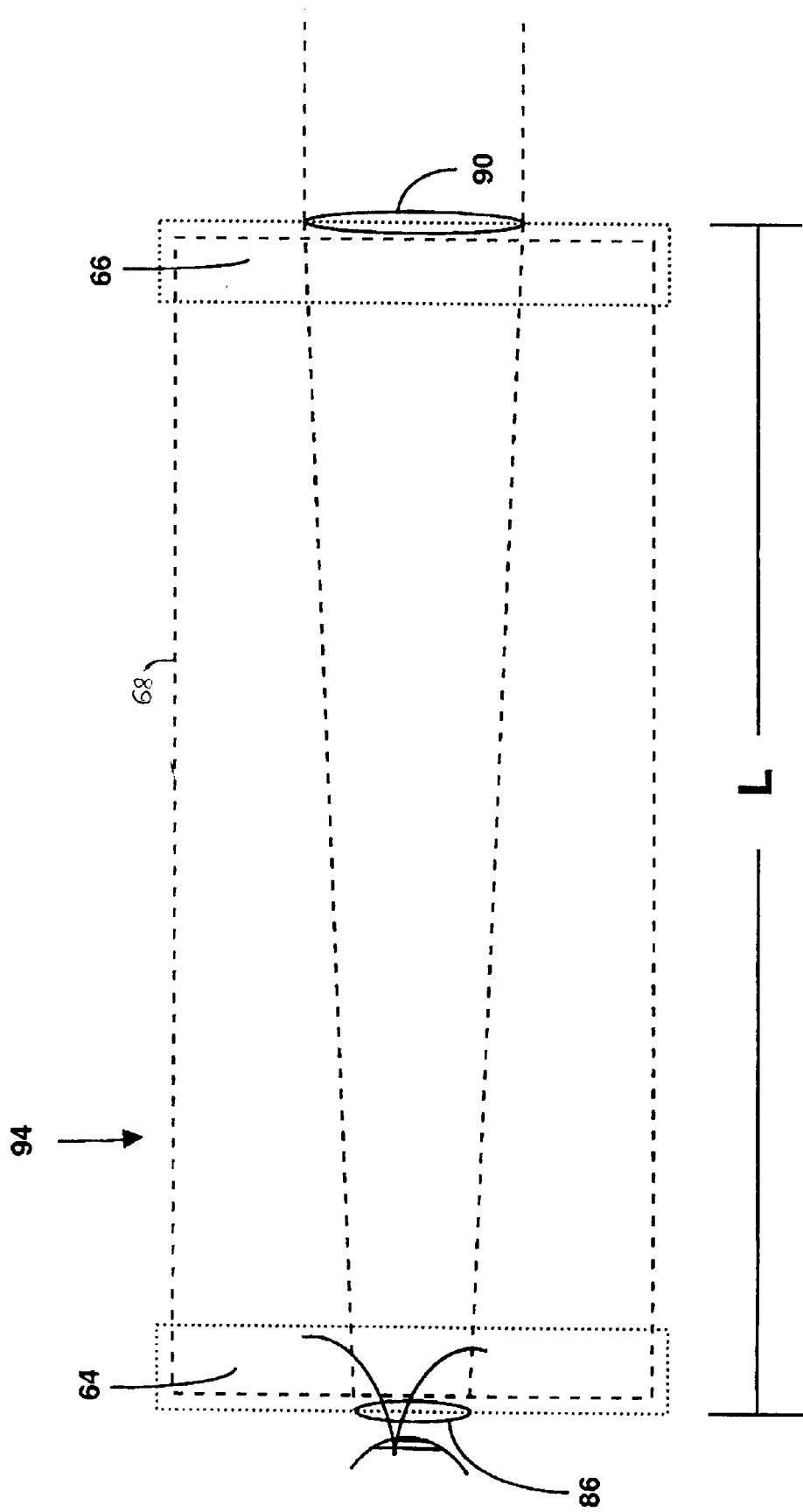

Referring now to FIGS. 11A and 11B, in one version of the elongated container 12, first end-cap 64 includes a convex lens 86 affixed over a circular opening 88 centrally located on the first end-cap 64. Second end-cap 66 includes a concave lens 90 affixed over a circular opening 92 centrally located on the second end-cap 66. Referring to FIG. 12, first hollow portion 66 has a length L chosen in relation to the focal lengths of convex lens 88 and concave lens 90 such that placing first end-cap 64 on one end 76, 80 of first hollow portion 68 and second end-cap 66 on the other end 80, 76 of first hollow portion 68 creates a refractory telescope 94.

Finally, pre-packaged s'more kit 10 may also include an educational accessory such as a magnifying glass or a telescope. Properly shaped, the educational accessory may take the place of one marshmallow 14 when packaged within elongated container 12. S'more kit 10 may also include an educational activity sheet attached around elongated container 12. The educational activity sheet may provide instructions for assembling and using roasting utensil 20, and for making s'mores. It may also include instructions for assembling refractory telescope 94 and information such as a star chart or information concerning wild life and plant life. Preferably, elongated container and its contents may be encased in clear shrink-wrap or other material to render the product tamper resistant.

While there is shown and described the preferred embodiment of the invention, it is to be distinctly understood that this invention is not limited thereto but may be variously embodied to practice within the scope of the following claims.

I claim:

1. A pre-packaged s'more kit, comprising:
   a plurality of flavored wafers;
   a plurality of crackers;
   a plurality of marshmallows;
   an elongated container for holding the flavored wafers, crackers, and marshmallows; and
   a roasting utensil configured to be held within the elongated container, the roasting utensil including:
   a roasting module with a first and second end:
   a plurality of elongated modules with first and second ends, a roasting tip configured to receive and hold a marshmallow, the roasting tip attached to the first end of the roasting module; and a plurality of sleeves corresponding to the number of elongated modules, each sleeve having first and second ends the first end of each sleeve attached to the first end of the elongated module, and the second end configured to receive and removeably attach to the second end of another elongated module or the second end of the roasting module.

2. The pre-packaged s'more kit according to claim 1, wherein the ratio of flavored wafers to crackers to marshmallows is 1:2:1.

3. The pre-packaged s'more kit according to claim 1, wherein the crackers are graham crackers.

4. The pre-packaged s'more kit according to claim 1, wherein the flavored wafers are Belgian chocolate.

5. The pre-packaged s'more kit according to claim 1, wherein the flavored wafers are butterscotch.

6. The pre-packaged s'more kit according to claim 1, wherein the flavored wafers are peanut butter.

7. The pre-packaged s'more kit according to claim 1, wherein the flavored wafers are strawberry.

8. The pre-packaged s'more kit according to claim 1, wherein the cross-sectional perimeter of the crackers and flavor ed wafers are shaped to be easily received into and secured within the elongated container.

9. The pre-packaged s'more kit according to claim 8, wherein the cross-sectional perimeters of the elongated container, the crackers, and the flavored wafers are circular.

10. The pre-packaged s'more kit according to claim 8, wherein the cross-sectional perimeter of the elongated container, the crackers, and the flavored wafers are polygonal.

11. The pre-packaged s'more kit according to claim 1, wherein the elongated container comprises:

a hollow body member having a first end and a second end a first end cap configured to securely attach to the first or second end of the hollow body member; and a second end cap configured to securely attach to the second or first end of the hollow body member.

12. The pre-packaged s'more kit according to claim 11, wherein the hollow body member comprises:

a first hollow portion;

a second hollow portion; and an inner sleeve inserted between and removeably joining the first and second hollow portions.

13. The pre-packaged s'more kit according to claim 11, wherein:

the first end-cap includes a convex lens affixed over an opening centrally located on the first end-cap; and the second end-cap includes a concave lens affixed over an opening centrally located on the second end-cap.

14. The pre-packaged s'more kit according to claim 1, wherein:

the plurality of flavored wafers are sealed in a resealable plastic bag;

the plurality of crackers are sealed in a resealable plastic bag; and the plurality of marshmallows are sealed in a resealable plastic bag.

15. The pre-packaged s'more kit according to claim 1, further comprising an educational activity sheet removeably affixed around the elongated container.

16. The pre-packaged s'more kit according to claim 1, further comprising an educational accessory, the educational accessory replacing one of the marshmallows.

* * * * *